Patented Mar. 25, 1924.

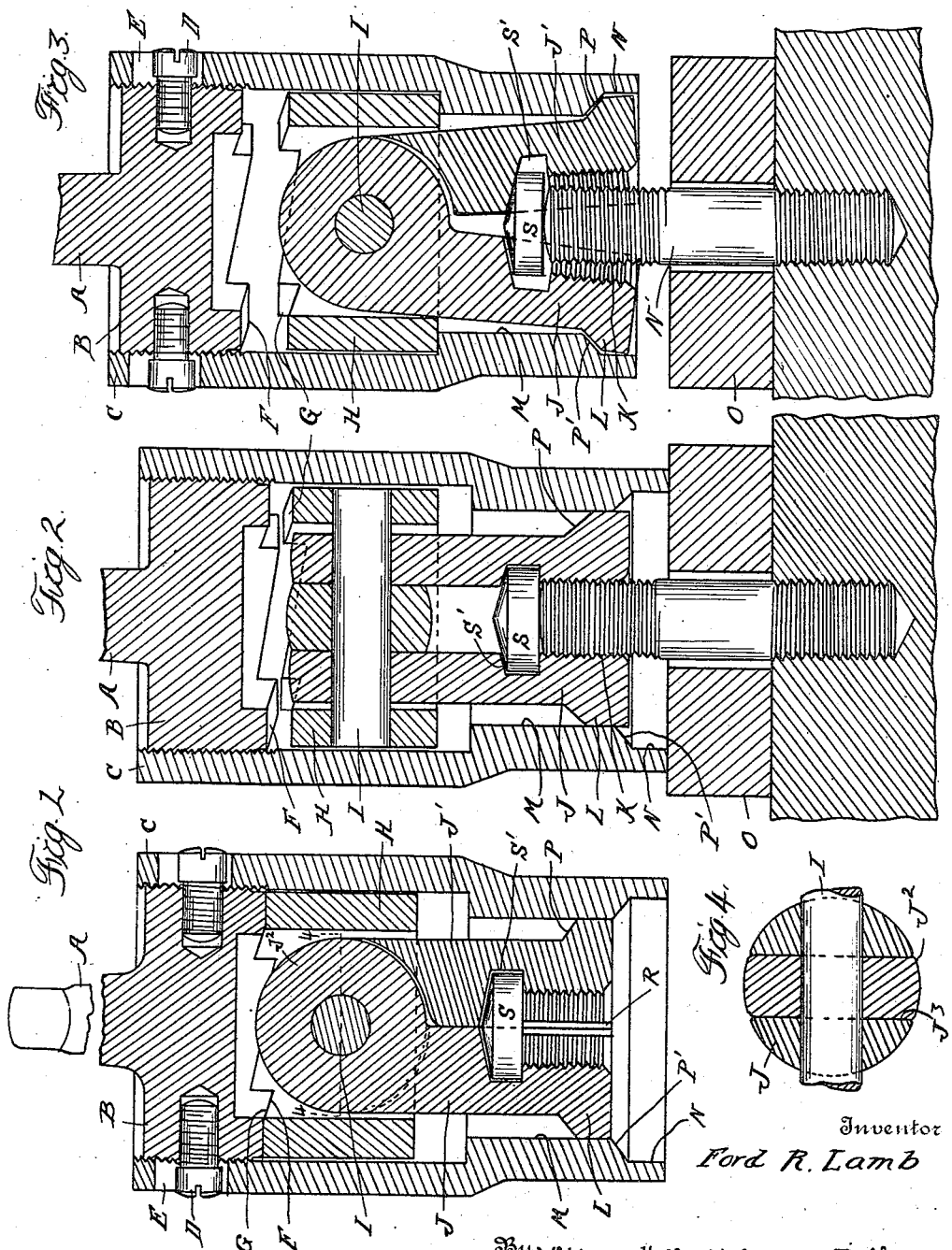

1,487,746

UNITED STATES PATENT OFFICE.

FORD R. LAMB, OF REDFORD, MICHIGAN.

STUD DRIVER.

Application filed December 16, 1922. Serial No. 607,335.

*To all whom it may concern:*

Be it known that I, FORD R. LAMB, a citizen of the United States of America, residing at Redford, in the county of Wayne and State of Michigan, have invented certain new and useful Improvements in Stud Drivers, of which the following is a specification, reference being had therein to the accompanying drawings.

This invention relates to stud drivers or power driven devices for turning studs into threaded bores.

It is the object of the invention to provide a stud driver that will have provision for engaging the driving end of the stud by a split nut or the like, which will be provided with a clutch connection to said nut, such as will establish a drive to the nut only after the latter has engaged the stud and will cut off said drive prior to release of the stud by the nut.

A further object is to provide a split nut stud driving element having the complementary portions of the nut so mounted as to insure accurate registration of the threads thereupon while permitting a free relative movement.

Still another object is to provide an adjustment that will permit accurate regulation of the distance through which the studs are driven.

These objects are attained by the construction hereinafter described and illustrated in the accompanying drawings, wherein:—

Figure 1 is an axial sectional view of the improved tool;

Figure 2 is a transverse axial sectional view showing the relation of the tool to the work at the moment of release of the drive connection;

Figure 3 is an axial section in the plane corresponding to that of Figure 2 but showing the tool withdrawn sufficiently to permit release of the stud by the split nut; and Figure 4 is a cross section on line 4—4 of Figure 1.

In these views the reference character A designates a standard tapered shank for engagement with the rotative holder or chuck of a drill press or the like. At its larger end said shank is formed with an integral head B which is screw threaded to engage the interiorly threaded upper portion of a sleeve C. D is a set screw which radially engages the head B and has its outer portion projecting through a longitudinal slot E in said sleeve. By withdrawal of the screw D the part A, B may be turned through one or more revolutions to axially adjust said part within the sleeve. The bottom face of the head B is formed with clutch teeth F and complementary clutch teeth G are formed upon the upper end of a collar H longitudinally slidable within the center portion of said sleeve. Said collar carries a diametrical pin I upon which are pivoted complementary nut forming members J and J'. The pivotal ends of said members have a tongue and groove engagement, as indicated at J², J³ (see Figure 4), whereby said members in undergoing relative angular movement upon the pivot pin I are restrained from any relative shifting in the direction of the pivotal axis. K designates a tapped stud-engaging opening jointly formed in the members J and J', said opening extending upwardly into said members and being central of the tool as regards its longitudinal axis in the normal or working position of the members J, J'. The nut J, J' is exteriorly formed at its lower end with an annular flange L which is adapted to snugly fit a portion M of the sleeve opening more restricted than the overlying portion receiving the collar H. Also below the portion M, the sleeve opening is somewhat wider than said portion, as indicated at N, said portion N being close adjacent the lower end of said sleeve. Thus when the collar H is in its lowermost position, as shown in Figure 3, the nut J, J' is sufficiently lowered relative to the sleeve C to engage the flange L in the enlargement N, which latter affords sufficient clearance to said nut to permit a divergence of the members J, J' such as will release the stud which is indicated at N'. It is to be noted that the upper face P of the flange L and the shoulder P' between the portions M and N of the sleeve bore are correspondingly bevelled so that when the nut rises within the sleeve from the position shown in Figure 3, the interengaging bevel faces P and P' will tend to contract the nut so that its flanged end may enter the bore M. O is a centrally apertured gauge block which is mounted upon the work surrounding the bolt N' providing a stop for engagement by the tool as will presently be described.

In the operation of the described tool, after the stud has been manually turned into a slight initial engagement with its bore sufficient to hold said stud upright and after the gauge block O is in place the described tool is fed down upon the stud. Before the latter is engaged the split nut and the collar H supporting the same will of their own weight assume the lowermost position, indicated at dash lines in Figure 1. Engagement of the stud by the nut J, J' will first have the effect of spreading the parts of the nut, as shown in Figure 3, thus allowing the upper portion of the stud to freely enter the opening K. The continued downward feeding of the tool will now force the nut J, J' and collar H upwardly within the sleeve C causing contraction of the members J, J' and engagement of the threads thereof with those of the stud N'. A still further down feeding of the tool will now carry the clutch face G of the collar H into engagement with the complementary clutch face F, thus establishing a drive to the stud through the clutch F, G, collar H and nut J, J'. This drive will continue to an extent predetermined by the thickness of the gauge block O. Thus when the down feed has proceeded sufficiently to seat the sleeve C upon said gauge block, as illustrated in Figure 2, the downward movement of the sleeve will cease while that of the collar H, nut J, J' and stud N' will continue (owing to engagement of said stud with the work) only until the clutch teeth G have cleared the clutch teeth F, as Figure 2 illustrates. Since such disengagement destroys the driving connection, rotation of the collar H, nut J, J' and stud N' will now cease. The operator now raises the tool and the parts H and J, J' dropping within the sleeve C of their own weight as well as due to engagement with the stud N' will assume their lowermost position shown in Figure 3 permitting a release of the stud.

From the preceding description it will be evident that the drive connection to the split nut is effected only after engagement of said nut with the stud to be driven and that breaking of said drive connection is accomplished prior to release of the stud by the nut. Thus there is avoided the severe stress upon the threads of the stud which occurs in such tools as maintain a driving connection to a split nut while engaging or disengaging the same from a stud. When the stud threads are so stressed they are likely to be either partially or entirely stripped owing to the longitudinal strain placed upon the reduced portions of the threads.

It is a further desirable feature of the construction that the nut forming members J and J' are mounted co-pivotally rather than for relative sliding, since the pivotal mounting permits quite a close engagement of said members with their pivot insuring accurate registration of the threads whereas said members, if relatively sliding would tend to bind unless fairly free upon the sliding support.

The adjustment provided for by the set screw D is a further advantageous feature of the invention, said adjustment controlling the extent of movement to which the collar H must be subjected longitudinally of the tool before establishing engagement of the clutch teeth F and G.

At each side of the meeting faces of the nut forming members J and J' the threads of the bore K are cut away, as indicated at R, so as to avoid the resistance to pivotal movement of said parts J and J' that might otherwise arise at said point.

It is preferred to mount a disk S freely in a chamber S' communicating with the inner end of the bore K and of a diameter somewhat greater than that of said bore, the top face of said disk forming a cone of very gradual inclination. Said disk takes the wear arising from the end thrust of the stud to be driven and furthermore the coned top face of said disk insures adequate clearance for pivotal swinging of the parts J and J' in releasing a driven stud without a locking effect arising between the end face of the stud and the complementary face of the nut J, J'.

What I claim as my invention is:—

1. In a device of the character described, the combination with a pair of complementary clutch elements, of a nut comprising complementary parts jointly forming a threaded bore, means mounting said nut upon one of said clutch elements adapting the parts of the nut for movement to and from each other, and a member adapted to be rotatatively driven mounting the nut-carrying clutch element for sliding movement along the axis of rotation and rigidly mounting the other clutch element, said member having a hollow portion snugly engaging the parts of said nut upon movement of the sliding clutch element toward the stationary clutch element, whereby said parts are forced into abutting relation preliminary to establishment of a drive to the nut through the clutch element.

2. In a device of the character described, the combination with a pair of complementary clutch elements, of a nut comprising complementary parts jointly forming a threaded bore for engagement by the work, means co-pivotally mounting the parts of said nut upon one of said clutch elements adapting said parts for angular movement to and from each other, and a member adapted to be rotatively driven, mounting the nut-carrying clutch element for sliding movement along the axis of rotation and rigidly mounting the other clutch element, said member having a hollow portion snugly engaging the parts of said nut upon movement of the sliding clutch element toward the stationary clutch element whereby said parts are forced into an abutting relation preliminary to establishing of a drive to the nut through the clutch elements.

3. In a device of the character described, the combination with a pair of complementary clutch elements, of a nut comprising complementary parts jointly forming a threaded bore, means mounting said nut upon one of said clutch elements adapting the parts of the nut for movement to and from each other, said parts being interlocked to prevent movement transverse to the first specified movement, and a member adapted to be rotatively driven mounting the nut carrying clutch element for sliding movement along the axis of rotation and rigidly mounting the other clutch element, and means upon said member acting upon the nut upon sliding movement of the latter and its supporting clutch element toward the first clutch element to automatically lock the nut parts in abutting relation preliminary to engagement of the clutch elements.

4. In a device of the character described, the combination with a pair of complementary clutch elements, of a nut comprising complementary parts jointly forming a threaded bore, means mounting said nut upon one of said clutch elements adapting the parts of the nut for movement to and from each other, a member adapted to be rotatively driven mounting the nut-carrying clutch element for sliding movement along the axis of rotation and holding the complementary clutch element fixed with relation to the sliding clutch element, means for adjusting the fixed clutch element to and from the sliding clutch element, and means carried by the last mentioned member for locking the nut parts in abutting relation preliminary to engagement of the two clutch elements.

5. In a device of the character described, the combination with a pair of complementary clutch elements, of a nut comprising complementary parts jointly forming a threaded bore, means mounting said nut upon one of said clutch elements adapting the parts of the nut for movement to and from each other, a member mounting the nut-carrying clutch element for sliding movement along the axis of rotation and having screw-threaded engagement with the other clutch element, means for securing said member in a plurality of rotative positions with respect to the screw-threaded clutch element providing for adjustment of the sliding clutch element toward the stationary clutch element, and means carried by said supporting member automatically locking the parts of the nut in abutting relation preliminary to engagement of the two clutch elements.

6. In a device of the character described, the combination with a sleeve adapted to be rotatively driven, of a clutch element fixed within said sleeve, a complementary clutch element slidable within the sleeve to or from said fixed element, a nut comprising complementary parts jointly forming a threaded bore, means mounting said nut upon the sliding clutch element adapting the parts of the nut for movement to and from each other, and means upon said sleeve effecting automatic locking of the nut parts in abutting relation preliminary to engagement of the clutch elements.

7. In a device of the character described, the combination with a sleeve having its opening restricted adjacent one end, of a clutch element rigidly carried within said sleeve adjacent the other end thereof, means for rotatively driving said sleeve, a complementary clutch element slidable within the sleeve to or from the rigid clutch element, a nut comprising complementary parts jointly forming a threaded bore, means mounting said nut upon the sliding clutch element adapting said parts for movement to and from each other, said parts being engageable within said restricted portion of the sleeve during movement of the sliding clutch element toward the fixed clutch element to effect locking of said parts in an abutting relation preliminary to establishing of a drive connection through the clutch to the nut.

In testimony whereof I affix my signature.

FORD R. LAMB.